June 20, 1961   M. J. LAVET ET AL   2,988,868
ELECTRONIC TIME-MEASURING ARRANGEMENT
Filed Feb. 21, 1956   4 Sheets-Sheet 1

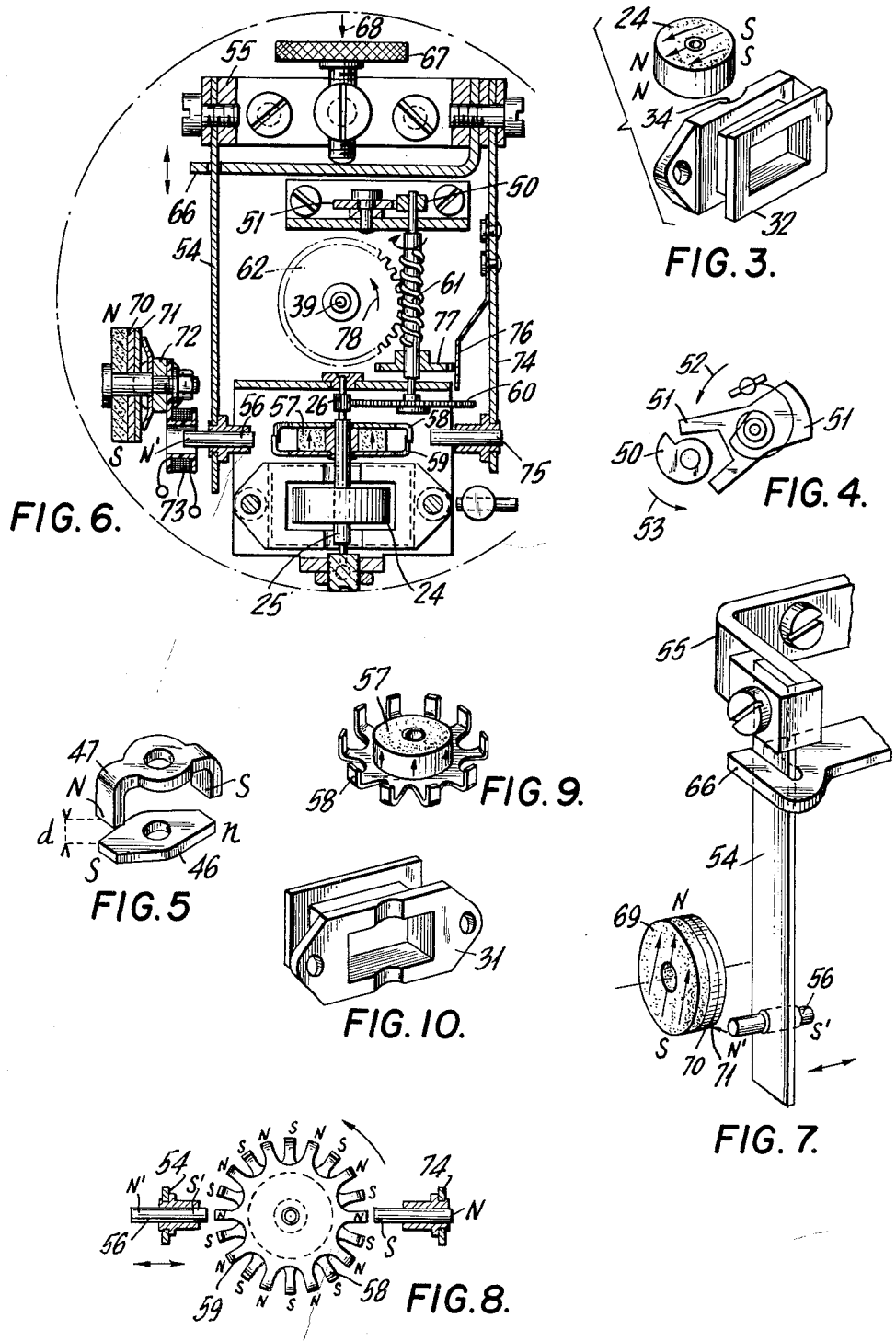

June 20, 1961  M. J. LAVET ET AL  2,988,868
ELECTRONIC TIME-MEASURING ARRANGEMENT
Filed Feb. 21, 1956  4 Sheets-Sheet 4
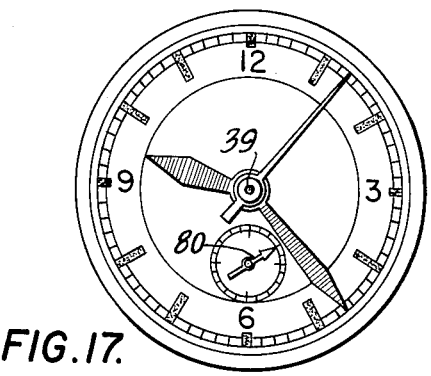
FIG. 17.
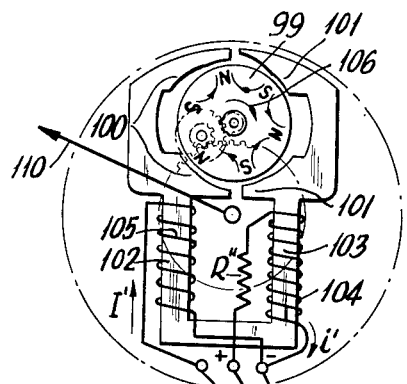
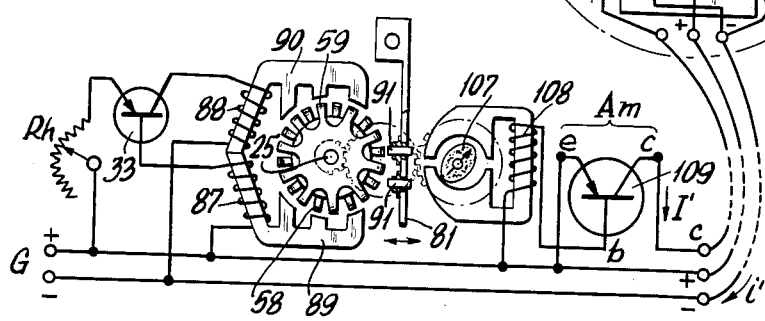
FIG. 18.
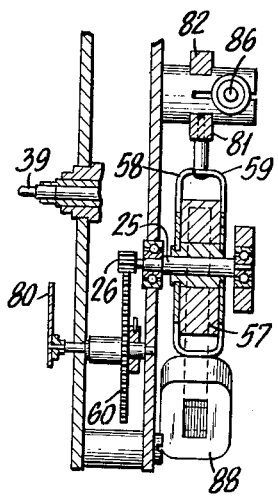
FIG. 15.
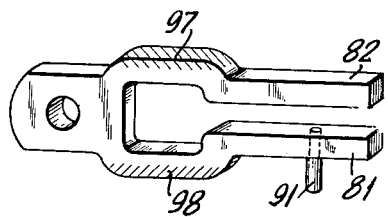
FIG. 16.

United States Patent Office 2,988,868
Patented June 20, 1961

2,988,868
ELECTRONIC TIME-MEASURING
ARRANGEMENT
Marius Jean Lavet and Jacques Jean Gustave Dietsch,
Paris, France, assignors to Etablissements Leon Hatot,
Paris, France, a corporation of France
Filed Feb. 21, 1956, Ser. No. 566,991
Claims priority, application France Dec. 15, 1955
5 Claims. (Cl. 58—23)

Our invention has for its object time measuring instruments and electronic transistor-controlled power units of which various embodiments have been already disclosed in our prior application Serial No. 453,392.

Our present invention has for its chief object improvements in independent time-measuring instruments and constant-speed power units actuated through low-voltage energy supplies, adapted to produce small unidirectional currents, such as voltaic cells, storage batteries, photocells, radioactive cells, rectifiers fed by A.C. distributing supplies etc.

Our invention has more particularly for its object, although it is not limited thereto a portable time-measuring instrument which may be constructed so as to occupy a small space and to include a small number of sturdy mechanical members, thereby lengthening its life and as a result of which its cost of manufacture is low.

In particular, our invention allows improving the watches and clocks used on board vehicles such as automobiles, street cars, railroad trains, ships, aircrafts and the like.

Our invention has more particularly for its object:

(1) The transformation of electric energy into mechanical work through the agency of small magneto electric driving members rotating at a reduced speed with a high electrical and mechanical efficiency.

(2) Making easier the starting of such driving members in a predetermined direction of rotation.

(3) The elimination of commutators and movable electric switches which are sources of risks and reducing the amount of sliding friction which may lead to instability and to wear.

(4) Eliminating and compensating for the disturbances due to the changes in the voltage of the sources of energy and to the changes in the ambient temperature.

(5) Improving the arrangements which allow easily correcting the lead and the lag of clocks.

(6) Increasing the driving power of parts revolving at perfectly uniform speeds.

(7) Increasing the sturdiness, simplifying the manufacture and reducing the bulk of clockworks and of motors revolving at constant speeds.

The preceding objects and advantageous features of our invention and other objects and features thereof will appear clearly in the reading of the following disclosure, and the accompanying drawings in which three embodiments of the invention are illustrated by way of examples and by no means in a limiting sense. In the drawings:

FIG. 1 is a diagram of a time-measuring instrument provided with a power unit according to the invention and illustrates the chief components of a time-measuring instrument regulated through an isochronous oscillating weight actuated by a magnet revolving constantly at a reduced speed and in a predetermined direction between two stationary coils so as to receive from one of the latter an intermittent driving impulse produced by a unidirectional current distributed under control of a junction transistor.

FIG. 3 is an exploded view illustrating separately and in perspective view, the driving magnet shown in FIG. 2 and the insulating bobbin carrying one of the coils surrounding said magnet.

FIG. 4 is a detail view of a safety arrangement adapted to constrain the driving magnet to revolve in a single direction.

FIG. 5 is a perspective view of the two primary components of a magnetic torque-limiting device inserted between the electronic power unit of FIG. 2 and an intermediate driving spring adapted to actuate through a constant periodic action an isochronous oscillating weight adapted to render uniform the speed of the time-measuring instrument illustrated in FIG. 1.

FIG. 6 is a diagrammatic partly sectional view of a second embodiment of the invention characterized chiefly by the use of a vibratory blade vibrating at a constant frequency under the action of a periodic magnetic impulse and acting as an isochronous oscillating regulator weight.

FIG. 7 is a perspective view of the vibrating blade shown in FIG. 6 and provided with magnetic means adapted to permit compensation for the influence of any change in the ambient temperature.

FIG. 8 is a detail view of a multipolar magnetic arrangement in the embodiment of FIG. 6 for regulating the comparatively low speed of rotation of the rotary magnet.

FIG. 9 is a separate perspective view of two members forming part of the multipolar magnetic arrangement illustrated in FIG. 8.

FIG. 10 is a perspective view of one of the two insulating bobbins carrying the coils surrounding the driving magnet in the instrument illustrated in FIG. 6.

FIG. 15 is a side view, partly sectional, corresponding to FIG. 14 and shows the means for driving a second hand revolving at a constant speed of one revolution per second.

FIG. 16 is an enlarged perspective view of the tuning fork serving as a speed regulator in the instruments illustrated in FIGS. 14 and 15.

FIG. 17 is an elevation view of the face of a watch to be used on board a vehicle or of a clock, of the type illustrated in FIG. 14, when provided with four hands showing respectively the hours, the minutes, the seconds and the hundredths of a second.

FIG. 18 is a diagrammatic view of the general arrangement of a time-measuring instrument of the type illustrated in FIG. 14 and actuating heavy hands through an auxiliary impulse actuated control power unit.

Figure 1:
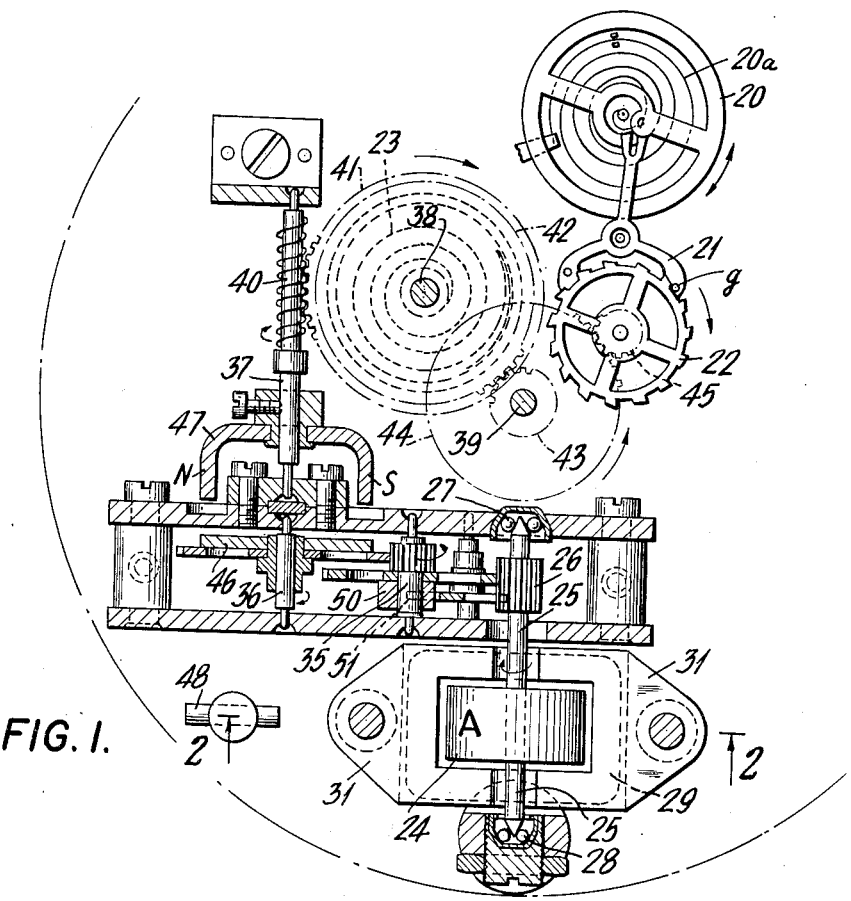
Figure 2:
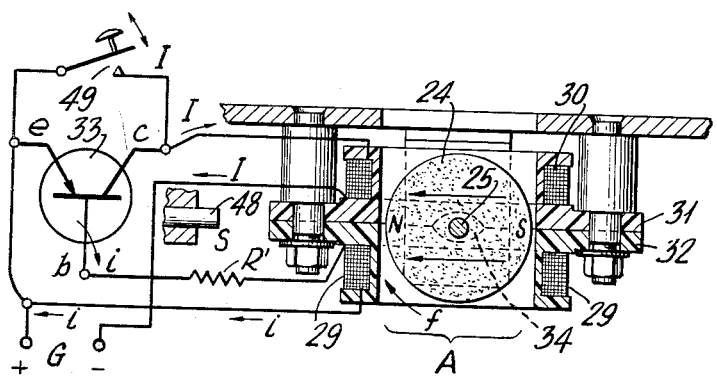
FIG. 2 is a schematic diagram illustrating the magneto-electric and electronic parts of the instrument illustrated in FIG. 1, the driving magnet and the windings surrounding the magnet being shown cross-sectionally in a plane perpendicular to the axis of rotation of said magnet.

Referring to FIGS. 1 and 2, it is apparent that the chief parts of a time-measuring instrument according to the invention are as follows:

(a) A rotor A revolving constantly under the action of a supply of energy G the terminals of which are shown in FIG. 2.

(b) A speed-reducing gear connecting the rotor with the time indicating hand and with a speed regulating device constituted by an isochronous balance-wheel 20, in anchor 21 and an escape wheel 22, and (c) An intermediate driving spring 23.

The balance-wheel 20 is associated with a spiral spring 20a made of a metal the elasticity of which is substantially constant whatever may be the changes in the ambient temperature, for instance it is possible to resort to the well-known iron and nickel alloys known under the name Elinvar as generally used for chronometric purposes.

The adjustment of the oscillating period of the isochronous balance-wheel is ensured by the parts generally used by clock and watch makers and it will be understood that any known type of escapement may be used instead of the parts shown at 20, 21 and 22, these parts being drawn diagrammatically for the sole purpose of showing a practical example.

The rotor A of the motor driving the instrument of FIG. 1 is constructed as a small bipolar magnet 24 carried by a vertical spindle 25 provided with a control pinion 26.

The magnet 24 illustrated separately in FIG. 3 is in the shape of a small cylinder of a diameter of about 5 to 15 millimeters with a height of 3 to 10 millimeters. It is preferably made of a material having a small volumetric mass with a considerable coercive field which may be for instance above 800 oersteds with a magnetic induction or density of flux as high as possible, say for instance 2,000 gausses.

The internal lines of force are approximately parallel with a diameter as illustrated in FIG. 2.

Particularly satisfactory results have been obtained with magnets having a diameter of 11 millimeters and a thickness of 7 millimeters. The magnets are made of an anisotropic material having as a base cobalt ferrite annealed at a high temperature or the like ferro-magnetic oxides such as the materials known under the name of Ferroxdure II and III.

The spindle 25 revolves as freely as possible inside carefully designed bearings. These bearings may be constituted in particular by miniature ball bearings 27 and 28 guiding the conical pivots at the ends of the spindle or by parts similar to those used for carrying balance staffs in watches or spindles of electricity meters and the like measuring instruments. The lower bearing 28 which is under a greater stress or loading than the upper bearing is preferably removable as illustrated in FIG. 1.

Around the bipolar magnet 24 are mounted two adjacent hollow coils having a rectangular cross-section as shown at 29 and 30 in FIGS. 1 and 2.

It is apparent that these twin coils are located very near the magnet 24 and its rotary spindle 25. The planes of their convolutions are parallel with the spindle and the convolutions or turns may enclose almost the totality of the alternating magnetic flux generated by the rotary magnet. The average perimeter of the convolutions is reduced to a minimum.

The coils 29 and 30 are made of very fine enameled copper wires forming numerous convolutions or turns wound over forms or bobbins of molded insulating material 31 and 32 provided with securing lugs whereby it is an easy matter to mount them in the manner illustrated in FIG. 2. One of said bobbins 32 is illustrated in perspective view in FIG. 3. The grooves 34 in the bobbins provide for a free passage for the spindle 25.

The coils 29 and 30 show considerable resistances of the magnitude of several hundred ohms. They are connected in the manner shown in FIG. 2, with the supply of energy G and with a junction transistor P-N-P illustrated diagrammatically at 33 by its three electrodes, namely the emitting electrode $e$, the collecting electrode $c$ and the base electrode $b$.

Before we continue describing the instrument illustrated in FIG. 1, we will examine the particular conditions for the execution of the electronic power unit illustrated in FIG. 2, since such a preliminary investigation is essential before we disclose certain of the improvements forming the invention.

When the magnet 24 is inoperative, the inner resistances of the semi-conductive crystals forming the transistor are extremely high and the output of the supply G is very low and in fact negligible.

Experience shows that when the magnet 24 receives a small initial impulse which causes it to rotate in the direction of the arrow $f$ (FIG. 2), there is obtained an intermittent flow of a current I in the circuit including the supply G, the electrodes $e$ and $c$ and the coil 30 forming the driving coil. To obtain this result, it is sufficient to make the connections in a manner such that the electromagnetic forces exerted tangentially on the magnet 24 may be directed in the direction $f$ so as to further the rotation of the magnet. These forces are at a maximum each time the magnet 24 enters the position illustrated in FIG. 2 for which the line connecting the poles N and S is approximately parallel with the general planes of the turns or convolutions of the coil 30.

Under such conditions, the rotor A is subjected to driving impulses, once per revolution, and it continues rotating by reason of its own inertia. The whole arrangement acts thus as a magneto-electric impulse motor, but the commutator and the brushes used in all known motors of this type are done away with.

By reason of the reduced driving power required by the clockwork mechanism and of the high efficiency of the power units subjected to a high and constant magnetic flux, the current I required is very reduced. Experiments have shown that the driving unit illustrated in FIG. 2 operates with an average electric power which is lower than 0.1 milliwatt. As a consequence of the fundamental properties of the P-N-P junction transistors, the establishment of a substantial current I, i.e. the weakening of the resistance of the semi-conductive crystal between $e$ and $c$ is established only when a current $i$ of a low intensity flows in the direction from $e$ to $b$. Now this result is obtained automatically under favorable conditions and at favorable moments through the coil 29 in which an alternating electro-motive force having a maximum value is induced through the rotation of the magnet 24. The coil 29 is connected in a manner such that the peak voltage generates a current $i$ each time the magnet occupies the position illustrated in FIG. 2. The current $i$ produces instantaneously a considerable lowering of the resistance of the connections between the electrodes $e$ and $c$, which allows the current I to flow through the coil 30 and to produce consequently the driving impulse.

The current $i$ which releases said impulse leads to a loss of energy, but by reason of the amplifying properties of the transistor 23, the power lost in the coil 29 is much lower than the driving power developed by the coil 30 and the movement of the magnet rotor has a tendency to accelerate.

It will be remarked that the combination of the magnet 24, the coil 30 and the transistor 33 as described hereinabove, allows construction of a very simple electronic power unit with a slow and unidirectional movement. This power unit requires no oscillating circuit and consequently does away with the necessity of using a large negative resistance and, instead of forming a linear amplifier, it behaves in the manner of a relay of the make and break type acting suddenly and at the desired moment with a view to releasing the circuit feeding the driving coil 30. The duration of each current impulse is a small fraction of the duration of revolution of the magnet 24, which reduces the output of the supply G.

The power unit thus constructed shows particular properties to be disclosed hereinafter after the description of the other parts incorporated with the instrument illustrated in FIG. 1.

As apparent from inspection of said FIG. 1, the spindle 25 of the electronic power unit is connected with the spring 23 and with the speed regulating balance wheel through gears carried by vertical spindles 35, 36 and 37 and by horizontal spindles 38 and 39.

The vertical spindle 37 is located in alignment with and above the vertical spindle 36 and is rigid with a worm 40 meshing with a worm wheel 41 to which is secured the end of the intermediate driving spring 23 in the shape of a spiral or of a helix. The outer end of the spring is rigid with a toothed wheel 42 coaxial with the worm wheel 41 and controlling the escape wheel 22 through gear wheels 43—44 and 45.

The horizontal spindle 39 carrying the gear wheel 43 revolves preferably at the speed of one revolution per minute and controls the seconds wheel on the dial. The other hands are controlled by the transmission means generally used by clock and watch makers and by reason of their conventional nature they have not been illustrated in the drawing.

The clockwork which has just been described is associated with auxiliary arrangements which are not essential but which cooperate in providing reliability and accuracy of operation.

Between the spindle 25 carrying the magnet rotor A and the intermediate driving spring 23 is inserted a magnetic coupling constructed as a magnet 46 rigid with a spindle 36 and the magnet 47 rigid with the spindle 37. The magnets 46 and 47 illustrated separately in FIG. 5 are positioned at a predetermined distance $d$ from each other and this distance is adjusted in a manner such that when the magnet 46 revolves under the action of the rotor A its movement is reliably transmitted to the spindle 37 and allows winding the inner end of the spring 23 to the required amount without any excess stressing. Under such conditions and during normal operation performed through supply of energy G which feeds a suitably selected voltage, the spindles 36 and 37 revolve at the same speed and the spring 23 remains moderately and uniformly tensioned. If the electric voltage at G increases fortuitously and reaches an exaggeratedly high value, the spring 23 cannot be wound to an extent such that the convolutions join each other because the worm 40 is no longer driven at such a moment.

It is apparent as a matter of fact that through a suitable adjustment of the spacing $d$ between the poles shown in FIG. 5, it is an easy matter to limit the power transmitted by the magnetic coupling or slip means so as to produce an automatic slipping action which stops the wheel 41 as soon as the angle of winding of the spring 23 has reached a predetermined high value. The transmission which has been temporarily cut off is restored after a certain time as soon as the unwinding of the spring 23 has sufficiently reduced the resistant torque exerted by the spring on the worm 40.

The starting of the power unit may be made easier through the following arrangement; near the rotor A there is located a small magnet 48 (FIG. 2) exerting on the driving magnet 24 an attraction the value of which is low and is just sufficient for producing, when the supply G is disconnected, an angular setting of the inoperative rotor A which is that illustrated in FIG. 2 i.e. a setting for which the line of poles NS is parallel with the planes of the convolutions of the coils 29 and 30.

Under such conditions, when it is desired to start the power unit in the desired direction (arrow $f$) it is sufficient to establish a short transient contact between the electrodes $e$ and $c$ of the transistor 33. A short current impulse then passes through the coil 30 and starts the rotation of the magnet 24. For this operation, it is possible to resort to the time setting means of the instrument illustrated in FIG. 1; for instance a rapid drawing out of the time-setting stem controlling the hands may easily provide for the closing of a switch such as switch 49 across the electrodes $e$ and $c$.

It has been found that when the closing of the switch 49 has lasted too long, the magnet 24 may return into its starting position and start rotating in the opposite wrong direction. The arrangement illustrated in FIGS. 1 and 4 allows eliminating such a drawback. It includes a snail-shaped cam 50 carried by the spindle 35 of the gear work and a pivoting fork 51 urged in the direction of the arrow 52 by a very weak spring. It is apparent that the fork stops the projection on the cam when the latter has a tendency to revolve in a direction opposed to the arrow 53.

The apparatus illustrated in FIGS. 1 and 2 has been tested and its parameters have received various values; it has been found that its operation is particularly satisfactory when the electro-magnetic parts conform to the following characteristic data.

(1) Bipolar magnet 24: weight of 2 grams of a material the magnetic induction B of which is of the magnitude of 2,500 gausses with a differential magnetic permeability (dB/dH) approximating that of air and vacuum (i.e. 1 Gauss/1 Oersted).

(2) Coil 29: 5000 convolutions or turns of pure enamelled copper wire of a diameter of 0.06 mm.

(3) Coil 30: 6000 convolutions of pure enamelled copper of a diameter of 0.05 mm.

(4) Supply G producing an electric voltage of 1.3 volts.

(5) Resistance R' between the base electrode $b$ and the coil 29 which may reach 40,000 ohms.

The power unit thus defined revolves at a speed of about 5 revolutions per second with an average current consumption which is lower than 30 micro-amperes. It ensures the operation of a time mechanism (FIG. 1) provided with two hands running over a dial having a diameter of twelve cm. A high grade voltaic cell the volume of which is lower than ten cubic cm. may supply the energy required for the operation of the instrument during more than five years.

With an isochronous balance wheel and a voltaic cell the voltage of which remains substantially constant as in the case of a cell of the mercuric oxide type for instance, it is unnecessary to operate successive disconnections of the coupling means 46—47. At the moment of the starting of the apparatus, the rotor revolves at a comparatively high speed while the spring 23 is gradually tensioned. This being done, the speed of the power unit decreases gradually until equilibrium between the opposing forces is obtained. From this moment onwards it is found that the winding arc of the spring 23 remains substantially constant and that the average speed of the magnet 24 remains in an unvariable ratio with the frequency of the isochronous oscillations of the balance wheel 20.

The principle of the arrangement illustrated in FIGS. 1 and 2 allows executing very small time indicating instruments, the consumption of electric energy in which is exceedingly small, while their operation lasts over more than one year with a miniature cell. Furthermore, the reduction in consumption does not require the use of a fine copper wire.

FIGS. 6 to 13 illustrate a second embodiment of the improved time-measuring instrument in accordance with the invention. The same reference numbers designate elements similar to those which have been described heretofore. These elements are the rotary magnet 24 carried by a vertical spindle 25, the releasing coil 29, the driving coil 30, the transistor 33 and the horizontal spindle 39 carrying the second hand revolving at a speed of 1 revolution per minute. We have also retained the auxiliary parts 48, 49, 50 and 51 for the angular setting of the rotor, the part played by which has been disclosed hereinabove.

With reference to the first embodiment illustrated in FIGS. 1 and 2, the principal changes consist firstly in using instead of the balance-wheel 20 a regulating member assuming a sinusoidal movement at a high frequency and secondly in substituting for the mechanical action of the anchor or lever 21 on the escape wheel 22 a periodic magnetic coupling.

It is a well-known fact that the usual time-indicating mechanisms such as that illustrated in FIG. 1 have the following disadvantages.

(1) The friction between the anchor pallets g and the escape wheel 22 is variable and produces irregularities in operation together with an objectionable wear.

(2) The oiled pivots on the staff of the circular balance-wheel 20 lead also to a loss of unstable energy which leads to unforeseeable reductions in the amplitude and periodicity of oscillation.

The arrangement illustrated in FIG. 6 allows overcoming these disadvantages, since the reciprocating isochronous regulator is no longer carried by a pivot and the forces acting on said regulator are exerted at a distance so as to cut out any sliding friction and mechanical wear.

The speed regulator is constructed in this case as a vibrating blade 54 made of so-called Elinvar alloy, which is an alloy similar to that forming the spiral spring 20a of the balance-wheel 20 in the case of FIG. 1.

The upper end of the blade 54 is rigidly secured to the support 55 which is rigid and stationary while the lower end of the blade assumes normally vibratory movements at a high frequency with a small amplitude. For instance, the frequency of vibration which depends on the mass assuming a reciprocating movement and on the elasticity of the blade is equal to 100 cycles per second while the amplitude of the vibrations of the end of the blade is of a magnitude ranging between 0.5 and 1.5 mm.

On the vibrating section of the blade 54 is secured a small transverse magnet 56 the pole S' of which is located at a short distance from the periphery of an auxiliary multipolar magnetic rotor carried by the spindle 25 of the power unit. The magnetic rotor includes the following parts: a short inner magnet 57 in the shape of a solid washer through which pass lines of force parallel with the axis of the spindle 25. On the north and south circular surfaces of said magnet 57, which are perpendicular to the spindle 25, there are provided two discs 58 and 59 made of mild steel of which one is illustrated with the magnet 57 in perspective view in FIG. 9. These disc teeth are narrow and elongated and are bent, in opposite directions for the two discs, in parallelism with the spindle 25 so as to interengage as shown in FIGS. 6 and 8 and to form thus an annular system of twenty alternating poles. It is apparent that these poles designated by N, S, N, S . . . in FIG. 8 move in succession past the pole S' of the small magnet 56. Consequently, there is produced a coupling through the alternating attraction and repulsion between the auxiliary rotor and the magnet on the vibratory blade 54. In particular when the spindle 25 revolves at a speed of ten revolutions per second, the magnet 56 is subjected to an alternating force, the frequency of which is equal to one hundred cycles per second. Under such conditions, the blade 54 vibrates at a mechanically resonant frequency and assumes a comparatively large amplitude.

Since more than a century, it is a well known fact that the forces exerted between a rotary member and a vibratory member have a tendency to provide for synchronisation of the rotary movement through the reciprocating vibratory movement. We will disclose hereinafter how the invention makes use of this well-known property with a view to imparting to the bipolar magnet 24 a well-defined speed which is in an accurate constant ratio with reference to the natural frequency of the blade 54. Furthermore, the frequency of the blade is much higher than the speed measured in numbers of revolutions per second of the power unit.

The rotation of the spindle 25 is transmitted to the spindle 39 of the seconds hand through the pinion 26, the toothed wheel 60 and the worm gear 61—62.

The electronic power unit is actuated through a voltaic cell or through a storage battery under constant voltage conditions or else through any supply of energy G' adapted to feed a unidirectional current. However in this latter case, it is necessary to provide a voltage regulator 63. The latter need not be described, since it may be executed in any well-known manner. Such voltage regulators operate on one of the following principles:

(a) Modifications in the resistance of a stack of carbon parts which are more or less compressed by a spring arrangement associated with an electro-magnet fed by the voltage to be adjusted.

(b) Combination of semi-conductors having a non-linear resistance and sensitive to the electric voltage to be stabilized or to the heat produced by such a voltage.

(c) Application of the properties of crystal rectifiers and electronic triodes.

(d) Use of transducers with a saturated iron core, etc.

Figure 11:
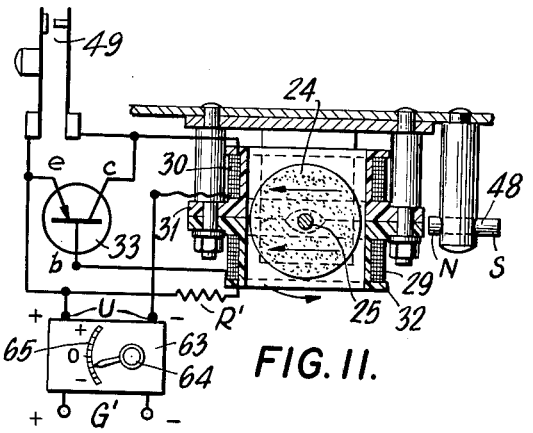
FIG. 11 is a detail view, partly diagrammatic, of the magneto-electric and electronic parts of the instrument illustrated in FIG. 6, the driving magnet and the coils being illustrated cross-sectionally in a plane perpendicular to the axis of rotation of said magnet.
Figure 12:
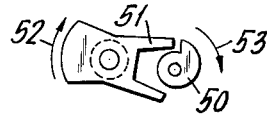
FIG. 12 is a diagrammatic view of the safety means constraining the driving magnet in the instrument of FIG. 6 to rotate exclusively in a predetermined direction.

In the invention preferably a regulator 63 is provided with a knob 64 making it possible to adjust and to modify if required the output voltage U indicated by a hand moving across a scale 65 as shown in FIG. 11 at the input end of the instrument.

The instrument illustrated in FIG. 6 may serve as a stationary clock or a watch for use on board of a vehicle assuming slow movements such as a ship. In this case the minute hand and the hour hand are driven by the spindle 39 which revolves at the speed of one revolution per minute through the transmission S of the type conventionally used in the construction of clocks driven by synchronous motors, and in particular, through the continuously or intermittently operating gears or ratchet mechanisms and the like transmissions used in meters. It is also possible to provide an indication of time through jumping figures appearing in a gate formed in the dial. Such arrangements are well known in the art and have not been illustrated.

The instrument shown in FIG. 6 includes the following auxiliaries, which latter are however not essential.

The very accurate adjustment of the natural frequency of vibration of the blade 54 is obtained by modifying by a small amount the length of its vibratory section through a member 66 forming a clamp surrounding the blade in the vicinity of its housing in the support 55. The clamping member 66 is for instance constituted by a small horizontal slightly yielding bar secured through its end to the support 55 as illustrated in FIGS. 6 and 7 and engaging the tip of the adjusting screw 67 (FIG. 6) provided with a large diameter head. The head of the screw carries a scale moving in front of a stationary mark 68. It is apparent that a rotation of the screw 67 produces a lowering or a raising through a small amount of the clamping member 66 inside which the blade 54 is slidingly fitted.

The so-called "Elinvar" alloys are not entirely devoid of sensitivity with reference to large changes in the ambient temperature and there should consequently be provided means for a complementary thermal compensation. These means allow furthermore correcting the disturbance due to the influence of temperature on the transistor 33 the amplifying power of which has a slight action on the period of the vibrating blade, the vibrations of which are sustained by the rotor 57, 58, 59.

These means compensating the effects of temperature are constituted by a system of three associated washers 69, 70 and 71. These washers are fitted over a stationary support 72 as illustrated cross-sectionally in FIG. 6, with the interposition of an elastic friction washer. It is an easy matter to modify the relative angular setting of the washers by a construction as follows: the washer 69 is a permanent magnet with a high coercive power, the lines of force of which are parallel with a diameter as shown in FIG. 7. The washers 70 and 71 form thermo-sensitive shunt members made of an iron and nickel alloy having a low Curie point, i.e. of an alloy the magnetic permeability of which varies in a reversible manner as a function of temperature, the range of temperature modifications to be considered being comprised between −20° C. and +50° C.

The washers are mounted in a manner such that the end N' of the vibrating magnet 56 is located at a comparatively small distance from one of the poles of the circular magnet washer 69. Under such conditions, there arises a magnetic attraction or repulsion between the stationary and movable poles which are nearest each other and this force which varies with temperature may modify slightly the natural period of the blade 54. This small correcting action may be easily adjusted since such an adjustment may be obtained through an angular shifting of the magnet washer 69. The most favorable position will be found by a series of methodically executed tests on a prototype. The action of these thermal compensating means is ascribable to the fact that a more or less considerable fraction of the magnetic flux produced by the stationary magnet 69 is shunted inside the washers 70 and 71. At raised temperature the washers are no longer ferro-magnetic and the totality of the magnetic field produced by the magnet 69 acts on the magnet 56 while at lower temperatures the washers 70 and 71 absorb the lines of force passing out of the magnet 69 and reduce the action exerted on the magnet 56 carried by the vibrating blade.

As we may also shift the pole N' of the magnet 56 nearer the pole S of the magnet 69 or the pole N of this latter magnet as the case may be, this allows obtaining corrections in either direction so as to make up for highly complex thermo-electric variations. It is also possible to neutralize the influence of temperature on the conditions of electronic sustainance of the vibrating blade 54.

Around the pole N' of the vibrating magnet 56 is arranged a small hollow coil 73 secured to the frame of the instrument shown in FIG. 6, and which may serve various purposes. In particular, it allows exerting an alternating force ensuring synchronism for, the blade 54 when a standard frequency current of one hundred cycles per second is available. The coil 73 forms also an electro-magnetic collector similar to the conventional pick-ups of talking machines. When the magnet 56 vibrates, it produces through induction inside the coil 73 an alternating electro-motive force the frequency of which is equal to that of the blade 54. This electro-motive force may be easily transformed into a signal which is amplified with a view to allow a measure of frequency or a comparison between frequencies or even the automatic control of repeating clocks or clocks synchronizing motors.

The instrument illustrated in FIG. 6 includes a further vibrating blade 74 provided with a magnet 75, the natural frequency of which is higher than that of the blade 54. The blade begins vibrating through resonance only when the magnet 24 revolves fortuitously at a speed above ten revolutions per second. In this case, the blade 74 acts so as to brake considerably the rotary motion of the spindle 25 or the like member rotating therewith. For instance, the braking friction may be produced through successive shocks between a small blade 76 secured laterally to the blade 74 and a rough-surfaced wheel 77 rigid with the worm-carrying spindle 61 controlled by the rotor as disclosed.

The instrument illustrated in FIG. 6 operates as follows (see also FIGS. 11 and 13):

After it has been connected with a supply G' producing a suitably selected voltage U, it is sufficient to close temporarily the switch 49 (FIG. 11) or to produce through any other suitable means a small driving impulse for the spindle 25. We obtain thus a starting of the motor in a direction which provides for the rotation of the central shift carrying the seconds hands in the direction of the arrow 78. The driving spindle 25 rotates at an always increasing speed and, as soon as the speed has reached a value $N_2$ equal to ten revolutions per second, the blade 54 which was heretofore stationary, begins vibrating under resonant conditions and assumes a vibration of a large amplitude at its natural frequency of one hundred cycles per second. The magnetic rotor 58—59 rotates then through one tenth of a revolution during each reciprocating oscillation of the magnet 56.

It is apparent that a motor having a tendency to revolve at a speed higher than $−N_2$ in the absence of the blade 54 assumes a satisfactorily stabilized uniform movement. The speed remains at its value $N_2$ in spite of the small modifications in the mechanical friction and in the driving torque.

A speed regulator of a similar type has already been used for adjusting the speed of hooters which serve for the production of sounds at a well defined acoustic level (Melde-Elsas system as described in the old magazine: Annalen der Physik und Chemie, vol. 23, page 194, 1884).

Figure 13:
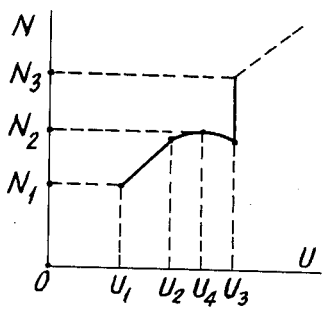
FIG. 13 is a graph illustrating the number of revolutions per second of the driving magnet as a function of the voltage governing the driving electro-magnetic impulses, and the curve illustrates the manner in which the vibratory blade serves as a speed regulator.

The same general phenomenon is used in the time-measuring instrument shown in FIG. 6, but its special structural features allow a considerable increase in its chronometric accuracy while eliminating any fortuitous disturbances which may arise through the following causes which will be readily understood, reference being made to the diagram of FIG. 13.

When the instument of FIG. 6 is connected with a voltage supply $U_4$ and is to serve as a portable clock exposed to fortuitous shocks, it is necessary to eliminate any possible racing of the power unit in the case of the blade 54 being held temporarily fast. In such a case the power unit which is no longer held against racing through the absorption of energy by the vibrations of the blade may rapidly assume a speed $N_3$ and continue revolving at the higher sped.

This drawback is avoided through the presence of the auxiliary blade 74 which starts vibrating under resonant conditions and brakes to a considerable extent the worm-carrying spindle 61. Thus, the blade 54 may act again as before so to constrain the magnetic rotor to revolve again at the desired speed $N_2=10$ revolutions per second.

Experiments have shown that the adjustment of the speed $N_2$ is properly ensured for voltages ranging between the limit voltages $U_2$ and $U_3$; however it has been found that the accuracy is improved when the voltage is uniform and is held at a value $U_4$ intermediate between $U_2$ and $U_3$. For small variations in voltage under and above $U_4$, the modification of the speed $N_2$ is very small and the relative variation is for instance smaller than 0.0001. Such small modifications of the period serve for correcting at a distance the operation of the clock shown in FIG. 6 when it is fed through a voltage regulator such as that illustrated at 63. The scale 65 may be graduated in seconds per day and the knob 64 behaves after the manner of the timing screw of an ordinary watch with the difference being that it may be located at a distance from the clock mechanism which also may be contained in a fluidtight case.

A third embodiment of our improved time-measuring instrument is illustrated in FIGS. 14, 15, 16 and 17.

This system relies on the principle of the instrument illustrated in FIG. 6 and includes a plurality of similar elements designated by the same reference numbers.

The chief modifications are disclosed hereinafter.

(a) The multipolar magnet including the parts 57, 58 and 59 is substituted for the magnet 24 (FIG. 15) and forms the rotor of an electronic power unit incorporating a transistor connected with the supply of energy G'.

(b) The spindle of the power unit is horizontal and acts on a time-piece, including a central high speed hand 80 revolving at a speed of one revolution per second.

(c) The vibrating blade 54 is replaced by a tuning fork with two legs 81 and 82 vibrating in opposite directions. The tuning fork is made of ferro-magnetic "Elinvar" alloy.

(d) The auxiliary anti-racing vibrating blade 74 is replaced by a thin and light blade 84 (FIG. 14) made either of hardened magnetized steel or else of mild steel which has not been previously magnetized. In this latter case the vibrations preventing the racing of the power unit are provided by the small periodical modifications in the attraction exerted on the end of said blade 84 by the projecting poles on the dual magnet 58—59.

(e) The adjustment of the natural frequency of the tuning fork is obtained by acting on the screw 85 which includes a terminal magnetic stem section 86 located at equal distances between the legs 81 and 82 of the tuning fork; a longitudinal shifting of the magnetic stem section 86 produces a modification in the attractive forces and this consequently modifies the vibratory period of the tuning fork to a slight extent.

In the power unit considered, the coils 87 and 88 connected with the transistor 33 are fitted on a lamellated stator including two sections. The sections forming the stator are obtained by cutting a sheet of the reduced loss type i.e. of the grade used for telephonic transformers. This stator includes two sections connected with each other through a V-shaped core. The two coils 87 and 88 are rectilinear and removably mounted on the core.

Figure 14:
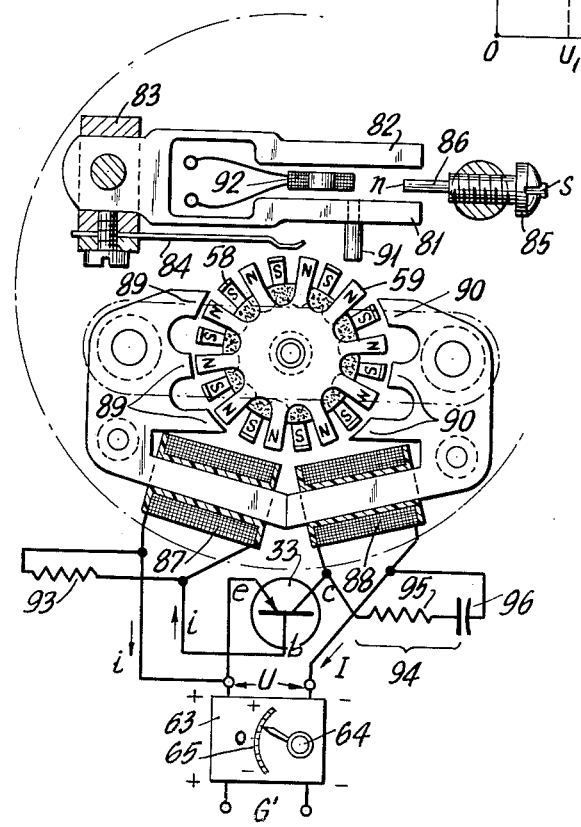
FIG. 14 is a partly diagrammatic illustration of a third embodiment of the time-measuring instrument according to the invention, including a multipolar electronic power unit the comparatively reduced speed of which is kept directly at a constant value through the isochronous vibrations of a tuning fork whose vibrations are sustained through a magnetic coupling.

The shapes of the teeth formed at the outer ends of the stator sections facing the rotor 58—59 are apparent from inspection of FIG. 14. The teeth 89 on the left hand side expansion face the poles N of the rotor 58—59 when the teeth 90 on the right hand side expansion face the poles S, on said rotor and reversely. Consequently a magnetic flux is produced inside the V-shaped core carrying the coils 87 and 88.

Each time the rotor 58—59 has turned by one twentieth of a revolution, the flux inside the V-shaped core is reversed.

When the power unit revolves, the flux passing through the coils is thus reversed twenty times per revolution and it induces inside the windings alternating electro-motive forces of the same frequency and with the same phase. We obtain consequently an operation which is similar to that which has been disclosed precedingly with reference to FIG. 2. However, the frequency of the pulsating currents $i$ and $I$ is ten times higher for the same speed N of the rotor. The increase in the speed of modification in the magnetic flux allows generating easily an inducing electro-motive force adapted to release periodically the circuit of the driving coil 88. It should be remarked that the power unit illustrated in FIG. 14 may be readily designed with a number of poles above 20.

A tuning fork, the natural frequency of which is equal to $F=200$ cycles per second, may render uniform the speed of the rotor (FIG. 14) provided with ten pairs of poles, by imparting to it a speed N of twenty revolutions per second. It is sufficient to this end to establish a magnetic connection between the tuning fork and the rotor, for instance through a small magnet 91 secured to the vibrating leg 81.

The tuning fork 81—82 may be synchronized from a distance through a weak signal at a standard frequency of four hundred cycles per second. This result is obtained by feeding a pulsating current of four hundred cycles per second into a small coil 92 the ferro-magnetic core of which is housed between the vibratory legs 91 and 92 as illustrated in FIG. 14. It is apparent that the coil 92 plays the part of the winding 73 provided in the precedingly described instrument illustrated in FIG. 6.

The electrical connections between the coils 87 and 88 and the transistor 33 are identical with those illustrated in FIGS. 2 and 11 and their operation is the same. However, by reason of the fact that the coils are fitted over high permeability ferro-magnetic cores, self-induction phenomena assume a considerable importance. For instance, the induction L of the driving coil 88 reaches a high value together with the electro-magnetic potential energy W which is equal to $\frac{1}{2}LI^2$.

This potential energy disappears when the core of the coil 88 loses its magnetism but it is transformed and if no special care is taken, it is found that a considerable overvoltage, above 50 volts, appears across the electrodes $e$—$c$ of the transistor 33. This overvoltage may damage the PNP crystals.

A further improvement within the scope of the present invention consists in the fact that there are inserted between the terminals of the coils 87—88 non-inductive shunt connections 93 and 94 respectively in which energy W may dissipate as heat through the Joule effect or as electro-static energy. For instance it is possible to insert across the terminals of the coils 87 a high non-inductive resistance such as a semi-conductor. Across the terminals of 88, it is possible to insert a shunt resistance 95 in series with a condenser 96 the capacity of which neutralizes the self-induction reactance. It is also possible to resort to a transistor 33 provided with comparatively large joining surfaces.

The instrument shown in FIG. 14 may be executed with a tuning fork of a conventional structure; however, for establishing at a low cost or price time mechanisms of a reduced size, it is preferable to produce in an economical manner this low frequency tuning fork. FIG. 16 shows an embodiment providing this advantage of a low cost. The fork illustrated in a perspective view may be cut automatically out of a strip of Elinvar alloy after which the thickness of the sections 97 and 98 is reduced through cutting or milling.

FIG. 17 shows one of the shapes which may be given to the dial of a time-indicating instrument of the type illustrated in FIG. 14. It is apparent that this instrument includes an auxiliary hand 80 revolving at a speed of one revolution per second. The diametrical size and the thickness of the instrument shown in FIG. 14 may be very small and thus the dial of FIG. 17 may be given a diameter of a magnitude of 2 to 5 cm. The system including such parts is readily incorporated with a compound time recording or indicating arrangement. The recording of time or time intervals with an accuracy within one hundredth of a second may be obtained through a simple instantaneous photograph of the dial illustrated in FIG. 17.

The time-measuring instruments illustrated in FIGS. 1, 6 and 14 may serve as master clocks, i.e. as clocks producing periodic currents capable of actuating one or more repeater clocks, for instance large and powerful fluidtight clocks or mechanisms of the releasable type e.g. requiring very high driving powers for their release.

One of the improvements according to the invention consists in resorting to one or more auxiliary synchronous motors running intermittently and at slow average speeds with a view to executing substantial mechanical operations, of an irregular nature while retaining the same accuracy as in the case of the heretofore described electronic power units.

FIG. 18 illustrates by way of example a combination of parts which allows reaching the desired object while eliminating the use of delicate or intricate members such as switches and catches.

It is possible to resort to a powerful auxiliary motor executed and controlled through means similar to those forming the multipolar power unit illustrated in FIG. 14 with a view to repeating the rotary movement of the output shaft of a time-measuring instrument according to our invention. The movement is transmitted with an amplification of mechanical power which allows for instance actuating heavy hands or operating controls which require considerable variable driving forces.

The time-measuring instrument and the auxiliary motor may be fed through a common supply of energy G under substantially constant voltage conditions.

The repeater is chiefly constituted by a hyper-coercive multi-polar magnetizing disc 99 provided for instance with six alternating poles revolving inside a stator formed by mild ferro-magnetic lamellated sections 100, 101, 102, 103 carrying the coils 104 and 105.

The outer sections 100 and 101 on the stator are limited by eccentric pole-pieces facing the poles of the rotor as illustrated in FIG. 18. The gaps provided therebetween have a comparatively great width equal to say 0.5 to 1.5 mm.

The coil 104 is permanently fed through the supply G with the interposition of a high resistance R".

In the absence of any current flowing through the coil 105, two poles N of the rotor 99 register with projecting sections 100 of the stator and two poles S register with the projecting section 101.

Each time the magnetic flux is reversed inside the cores 102, 103, the rotor 99 revolves through one sixth of a revolution and this reversal occurs whenever the coil 105 is fed by a current I' of short duration and of a comparatively high intensity. To this end the coils 104 and 105 are connected in a manner such that the magneto-motive forces generated by the currents $i'-I'$ oppose each other.

After the interruption of the current of an intensity I', the flux is reversed again and assumes again the original value due to the permanent current $i'$.

The current impulses I' are produced at comparatively widely spaced time intervals by the master clock shown in FIG. 18 which incorporates a time-measuring instrument of the type illustrated in FIG. 14. It is also possible to use in a similar manner the instruments described with reference to FIG. 1 or to FIG 6.

The elements described above are designated in FIG. 18 by the same reference numbers as in the preceding examples.

The driving impulses from the power unit 58—59 are transmitted through speed reducing gears providing for the rotation of the bi-polar magnet 107 at a speed which is equal to one revolution per second. This magnet is housed inside a bi-polar stator provided with a coil 108 inside which is induced an alternating electromotive force at a frequency of one cycle per second, which force produces the input signals for an electronic non-linear amplifier A$m$ producing in its turn the control impulse I'.

The amplifier A$m$ is a so-called power transistor 109 operating in the same manner as the transistor 33, the part played by it has been disclosed. Under the influence of an electric voltage of a predetermined polarity, the resistance of the semiconductor crystals between the electrodes $e$ and $c$ assumes a very small value and allows the flow of a substantial current. The short voltage impulse, which releases said current I' is produced by the stator coil 108 under the action of the revolving magnet 107 and is repeated once every second. Consequently the magnet 99 of the auxiliary synchronous motor rotates by one sixth of a revolution during the passage of each current impulse I' through the coil 105 and then by one further sixth of a revolution immediately after the current impulse has stopped. The average speed of the rotor 99 is consequently equal to one third of a revolution per impulse, i.e. per second.

The torque developed by the synchronous motor of FIG. 8 may serve for instance for rotating the hand 110 at the speed of one revolution per minute. It is thus possible to produce a considerable operative torque acting on the spindle carrying the hand 110, since the amplifier A$m$ allows distributing comparatively intense currents I'. Furthermore the increased torque transmitted to the hand 110 does not disturb chronometric accuracy since the speed of the rotor 99 depends solely on the operation of the vibrating blade 81 and of the rotary magnet 58—59 revolving with a considerable freedom.

Experience shows that an auxiliary motor incorporating a coil 105 fed with current impulses of a power of about one watt is adapted to actuate the hands of a clock provided with an unprotected dial having a diameter above one meter.

The applications and the embodiments of the invention are by no means strictly limited to the three examples described in detail hereinabove since various minor changes, modifications and improvements of the different parts of our invention will immediately appear to the mind of anyone skilled in the art and may be executed within the scope of the present invention as defined in the accompanying claims.

What we claim is:

1. In an electronic power apparatus, in combination, a circular magnet rotatably mounted for rotation about an axis thereof, the magnet having a polar line with two diametrically opposite poles of opposite polarity, two flat stationary coils having parallel turns on both sides of the axis of the circular magnet, a source of power, a transistor including an emitter electrode, a base electrode and a collector electrode, a first circuit connecting said source to both ends of one of said coils through the emitter electrode and the collector electrode, the last-mentioned coil corresponding to a motor coil, means for short circuiting at will from said first circuit said emitter and said collector electrodes, a second circuit connecting said source, said base electrode and said second coil as a pulse generator for unlocking at intervals said transistor, magnetic means placed in proximity of said rotatable magnet for automatically positioning the polar line of said rotatable magnet in a start position parallel to the planes of the turns of said coils when the source of power is ineffective, and mechanical means for preventing rotation in a wrong direction of said circular rotatable magnet when the motor coil is energized.

2. An electric apparatus according to claim 1, comprising a rotatable shaft disposed along the axis of the circular rotatable magnet, a pinion mounted on said shaft, a wind-up mechanism controlled by said pinion, and slip means connecting the wind-up mechanism to said rotatable magnet thereby allowing the rotation of said circular rotatable magnet when the wind-up mechanism is completely wound up.

3. An electric apparatus according to claim 1, comprising a rotatable shaft disposed along the axis of the rotatable circular magnet, a multipolar rotor carried by said shaft, spaced axially of the rotatable magnet, two vibratory blades magnetically coupled with said multipolar rotor disposed to impose on said rotor a speed of rotation in relation with the frequency of said blades, and time indicating means controlled by the shaft of said rotor, and transmission means cooperative with said shaft for controlling said time indicating means.

4. An apparatus according to claim 1, in which the magnetic means for setting the polar line in the start position is a permanent cylindrical fixed magnet disposed laterally of the rotatable circular magnet and having a longitudinal axis disposed in a plane parallel to the turns of the coils and passing between said coils and including the axis of said rotatable circular magnet.

5. An apparatus according to claim 4, further comprising a snail-shaped cam, means controlled by the rotatable circular magnet for rotating said snail-shaped cam, a pivoting fork having prongs for embracing said cam, means for urging said fork in a direction opposed to the rotation of the means under the control of the circular rotatable magnet.

References Cited in the file of this patent

UNITED STATES PATENTS

| | | |
|---|---|---|
| 1,719,805 | Hammond | July 2, 1929 |
| 1,825,382 | Baker | Sept. 29, 1931 |

(Other references on following page)

UNITED STATES PATENTS

| | | |
|---|---|---|
| 1,851,586 | Knobel | Mar. 29, 1932 |
| 2,266,037 | Henninger et al. | Dec. 16, 1941 |
| 2,492,435 | Ostline | Dec. 27, 1949 |
| 2,513,913 | Boyles | July 4, 1950 |
| 2,743,614 | Clifford | May 1, 1956 |
| 2,814,769 | Williams | Nov. 26, 1957 |

FOREIGN PATENTS

| | | |
|---|---|---|
| 1,090,564 | France | Oct. 20, 1954 |
| 1,092,411 | France | Nov. 10, 1954 |